(12) United States Patent
Johann

(10) Patent No.: US 12,043,316 B2
(45) Date of Patent: Jul. 23, 2024

(54) COMPONENT OF A MOTOR VEHICLE

(71) Applicant: Dr. Ing. h.c. F. Porsche Aktiengesellschaft, Stuttgart (DE)

(72) Inventor: Michael Johann, Tamm (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 5 days.

(21) Appl. No.: 17/590,065

(22) Filed: Feb. 1, 2022

(65) Prior Publication Data

US 2022/0324518 A1    Oct. 13, 2022

(30) Foreign Application Priority Data

Apr. 7, 2021   (DE) ............... 10 2021 108 564.0

(51) Int. Cl.
    *B62D 25/08*    (2006.01)
    *B60R 5/00*    (2006.01)
    *B62D 29/04*    (2006.01)

(52) U.S. Cl.
    CPC ............. *B62D 25/087* (2013.01); *B60R 5/00* (2013.01); *B62D 29/043* (2013.01)

(58) Field of Classification Search
CPC ...... B62D 25/08; B62D 25/087; B62D 25/20; B62D 29/00; B62D 29/001; B62D 29/005; B62D 29/04; B62D 29/043; B60R 5/00; B60R 5/02; B60R 5/04; B60R 13/01
USPC ........... 296/29, 30, 37.1, 37.14, 37.16, 37.6, 296/37.8, 39.1, 203.04; 224/329, 400, 224/404, 488, 544
See application file for complete search history.

(56) References Cited

U.S. PATENT DOCUMENTS

| | | | | |
|---|---|---|---|---|
| 3,791,552 | A | * | 2/1974 | Hayes ............... B65D 21/0224 206/502 |
| 6,095,409 | A | * | 8/2000 | Tsai ....................... B65D 71/02 229/199 |
| D770,271 | S | * | 11/2016 | McBride ....................... D9/424 |
| 10,786,955 | B2 | * | 9/2020 | Humfeld ............... B29C 70/386 |
| 2012/0280533 | A1 | * | 11/2012 | Gachter .................. B60J 5/101 296/146.8 |
| 2014/0352886 | A1 | * | 12/2014 | Choi ................... H01M 50/204 156/297 |
| 2015/0108208 | A1 | * | 4/2015 | Nash ......................... C09J 7/35 229/245 |

(Continued)

FOREIGN PATENT DOCUMENTS

| | | |
|---|---|---|
| DE | 102015201712 A1 | 8/2016 |
| DE | 102018214004 A1 * | 2/2020 |

(Continued)

OTHER PUBLICATIONS

Takamasa et al., "Tray for Automobile Interior", Published: Feb. 11, 2021, Publisher: Japanese Patent Office, Edition: WO2021024663A1 (Year: 2021).*

(Continued)

*Primary Examiner* — Joseph D. Pape
(74) *Attorney, Agent, or Firm* — Buchanan Ingersoll & Rooney PC

(57) ABSTRACT

A component of a motor vehicle, which is reinforced in at least one region subject to tensile loading by at least one stiffening tape having fibers embedded in plastic. This should make it possible to achieve local and weight-optimized stiffening.

17 Claims, 2 Drawing Sheets

(56) References Cited

U.S. PATENT DOCUMENTS

Figure 1:
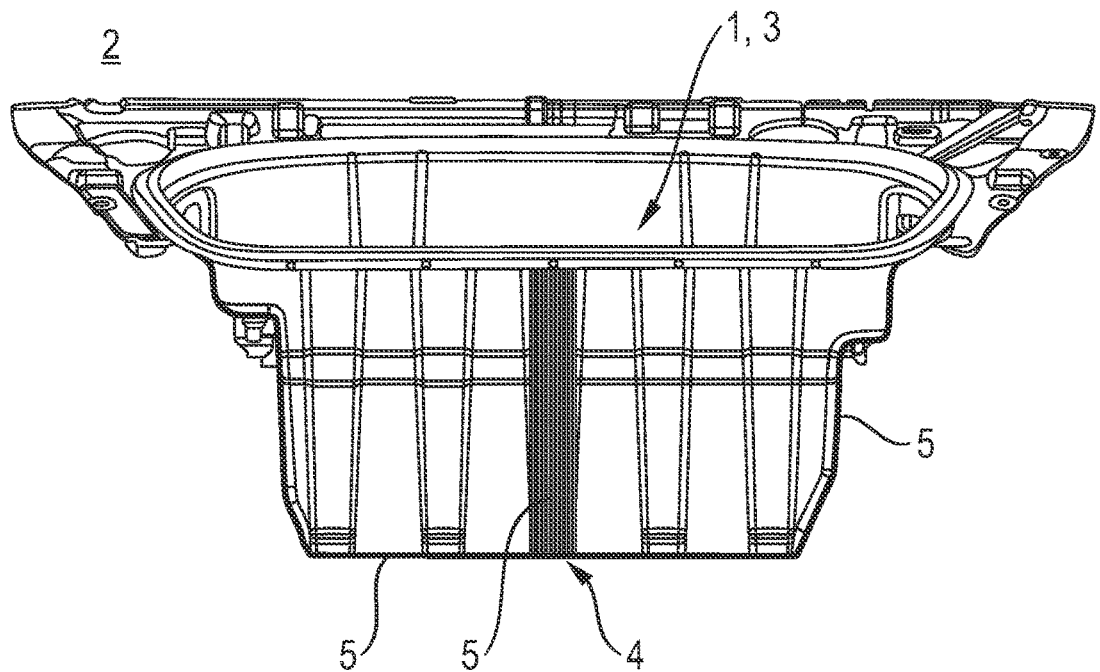

| | | | |
|---|---|---|---|
| 2016/0368547 A1* | 12/2016 | Franceschini | B62D 43/10 |
| 2018/0375075 A1* | 12/2018 | Yoshimura | H01M 50/227 |
| 2019/0077321 A1* | 3/2019 | Baranowski | B60R 5/04 |
| 2019/0263255 A1* | 8/2019 | Elsasser | B60K 15/03 |
| 2019/0300074 A1* | 10/2019 | Baranowski | B32B 27/10 |
| 2020/0369328 A1* | 11/2020 | Lichter | B62D 27/065 |
| 2020/0376954 A1 | 12/2020 | Bouffier | |

FOREIGN PATENT DOCUMENTS

| | | | | |
|---|---|---|---|---|
| EP | 3154828 A1 | 4/2017 | | |
| EP | 3224119 B1 * | 6/2019 | | B29C 70/74 |
| EP | 3747745 A1 * | 12/2020 | | B60R 13/011 |
| WO | 2019081410 A1 | 5/2019 | | |
| WO | WO-2021024663 A1 * | 2/2021 | | |

OTHER PUBLICATIONS

Jaeschke, "Vehicle component reinforced by means of deposition technology, as well as device and method for production", Published Feb. 20, 2020, Publisher: German Patent Office, Edition: DE102018214004A1 (Year: 2020).*

Keigler et al., "Method for Reinforcing a Component of a Motor Vehicle Chassis", Published Feb. 26, 2019, Publisher: German Patent Office, Edition: EP-3224119-B1 (Year: 2019).*

* cited by examiner

COMPONENT OF A MOTOR VEHICLE

CROSS-REFERENCE TO RELATED APPLICATION

This application claims priority to German Patent Application No.: 10 2021 108 564.0, filed Apr. 7, 2021, the content of such application being incorporated by reference herein in its entirety.

FIELD OF THE INVENTION

The present invention relates to a component of a motor vehicle. The invention also relates to a motor vehicle having such a component.

BACKGROUND OF THE INVENTION

DE 10 2015 201 712 A1, which is incorporated herein by reference, discloses a method for producing a support structure in an injection molding tool, which method comprises the following method steps: injection molding a basic structure, providing a stiffening structure, wherein the stiffening structure has a sandwich construction, comprising a core layer and at least one cover layer connected to the core layer. Then, arranging the stiffening structure in the injection molding tool, forming the stiffening structure on the basic structure, and also connecting the basic structure and the stiffening structure by a material bond and/or a form fit. This should make it possible to provide a support structure which is distinguished by a reduced inherent weight along with high mechanical stability and good stiffness.

WO 2019/081410 A1, which is incorporated herein by reference, discloses a liquid container for a motor vehicle, having at least one storage volume for storing a liquid and having at least one shell, which delimits the storage volume at least in certain portions. In this context, the shell is produced at least partially in an injection molding process and has a barrier film and a reinforcing element, which is formed at least partially or completely from a thermoplastic fiber composite material. Furthermore, the shell has a single-part or multi-part support structure, which is formed at least partially or completely from an injection molding material, the barrier film being connected to the reinforcing element by a material bond, and the barrier film and the reinforcing element each being connected to the support structure by a material bond. This should provide a liquid container which is lightweight, dimensionally stable and crash-proof, and can be produced with minimum emissions.

U.S. Pat. No. 10,786,955 B2, which is incorporated herein by reference, discloses a device and a method for producing a composite structure, a backing plate being connected to a composite plate via a composite tape.

EP 3 154 828 B1, which is incorporated herein by reference, discloses an energy-absorbing device having a polymer reinforcing structure, which comprises a polymer matrix and chopped fibers, and also a shell which comprises two walls extending from a back side and forming a shell channel. Here, the shell comprises continuous fibers and a resin matrix, the polymer reinforcing structure being arranged in the shell channel and comprising honeycombs and/or ribs.

Especially in sports car manufacturing, what is desired are lightweight components, which are often in the form of light metal components or plastics components, for example. In addition, fiber-reinforced plastics parts also come into consideration, for example carbon-fiber-reinforced plastics components, which, although they are lightweight and have high strength and stiffness, are also comparatively expensive.

SUMMARY OF THE INVENTION

The present invention is therefore concerned with the problem of specifying a component for a motor vehicle which has a lightweight construction, has high strength and at the same time is cost-effective.

The present invention relates to the general concept of reinforcing a component of a motor vehicle only in certain regions at precisely those locations that during operation are also exposed to corresponding tensile loading. The component according to aspects of the invention is thus reinforced in at least one region subject to tensile loading by means of at least one stiffening tape having fibers embedded in plastic. A stiffening tape of this kind is able to be applied to the component to be stiffened without significant thickness application and to stiffen said component locally, that is to say in the present case preferably exclusively in a region subject to tensile loading, and as a result to considerably increase the strength and stiffness of said component without there being an increase in the weight of the component overall, for example owing to a higher wall thickness in all locations for achieving a higher strength. The loading acting on the component according to aspects of the invention during operation is calculated here for example by means of a finite element method, as a result of which regions which are particularly subject to tensile loading during operation are identified and can be stiffened by means of the stiffening tapes according to aspects of the invention. The at least one stiffening tape is therefore provided only at precisely that location at which also the increased tensile loading occurs and accordingly is to be absorbed, while adjacent regions may have a less stiff form, for example also with a lower wall thickness, and as a result a more lightweight form. The great advantage of a stiffening tape applied only locally is moreover that the comparatively expensive stiffening tape is not used on the entire component, but rather exclusively in those regions in which the increased tensile loading also actually occurs.

Expediently, the component is in the form of a luggage tub. During operation, a luggage tub of this kind must be able to receive and carry heavy items of luggage itself, without exceeding a predefined deformation in the process. This can be achieved for example in that the luggage tub is formed with a corresponding wall thickness, this resulting in an overall higher weight. Further possibilities are afforded by ribs and stiffening webs, which do, however, require comparatively complex manufacturing, for example using a correspondingly complex plastics injection molding tool. Even plastic webs of this kind increase the weight to a not inconsiderable extent. The stiffening tape according to aspects of the invention makes it possible for the first time to form the luggage tub per se with a comparatively thin wall thickness and therefore not only in a cost-effective, resource-conserving and lightweight manner, but also for it to have a comparatively stiff form, since the luggage tub is stiffened by means of the at least one stiffening tape according to aspects of the invention at precisely those locations in which precalculated tensile loading also actually occurs.

Expediently, the stiffening tape is in the form of UD (unidirectional) tape having unidirectional fibers. Stiffening tapes of this kind are already widely known, and in virtually any configuration, that is to say with reference to thickness, width and/or fiber proportion. Providing stiffening tapes of different widths makes it possible consequently to individually influence the stiffening effect and to adapt it to the respective actually occurring tensile loading.

Expediently, the stiffening tape comprises glass fibers or carbon fibers. Of course, it is also possible to use aramid fibers or other fibers, in particular carbon fibers allowing high tensile strength and thus a high stiffening effect combined with low weight and low costs. Of course, the stiffening tape may additionally or alternatively also comprise natural fibers, the stiffening tape being subject exclusively to tensile loading in the event of loading and for the purpose of stiffening.

In a further advantageous embodiment of the component according to aspects of the invention, the stiffening tape comprises a plastic matrix of a thermoplastic material, in which the fibers are embedded. This offers the great advantage that the fibers, for example the glass fibers or the carbon fibers, are completely covered with the plastic of the plastic matrix and as a result are arranged in a manner protected thereby. Embedding the fibers into the plastic matrix also pre-fixes their location.

Expediently, the component is formed from a thermoplastic material. Thermoplastic materials of this kind, also referred to as plastomers, are plastics which can be plastically deformed within a predefined temperature range. Thermoplastics are nowadays already widely used for plastics injection molding processes and allow virtually any desired shaping. One particular property of thermoplastics is their weldability, as a result of which it is possible for example to weld, and thereby connect by a material bond, the stiffening tape, which likewise may comprise a plastic matrix of a thermoplastic, and the component, for example the luggage tub. A further advantage of a thermoplastic material of this kind is its comparatively low weight, as a result of which, together with the stiffening action of the stiffening tapes used according to aspects of the invention, it is possible to provide a weight-optimized and nevertheless stiff and strong component.

In a further advantageous embodiment of the component according to aspects of the invention, it is formed from metal, for example a light metal, in particular aluminum or magnesium. In particular light metal offers the possibility here that the component has not only a lightweight but moreover also a stiff form. One possible way of connecting the stiffening tape to such a component or a component formed from plastic consists here of an adhesive bond or alternatively also a welded connection. By way of an adhesive bond, it is purely theoretically also possible to use further plastics both for the component and for the plastic matrix of the stiffening tape. If the component is formed from a thermoplastic material, for example, it is even possible to embed the stiffening tape per se into the plastic of the component, provided that said stiffening tape for example is placed beforehand into a corresponding plastics injection molding tool and has the thermoplastic of the component injection molded around it.

The present invention is also based on the general concept of equipping a motor vehicle with a component corresponding to the preceding claims, in this case the component preferably being in the form of a luggage tub. A motor vehicle of this kind allows items of luggage to be carried along in a weight-optimized manner owing to the comparatively lightweight but nevertheless strong and stiff luggage tub.

Further important features and advantages of the invention will emerge from the subclaims, from the drawings and from the associated figure description based on the drawings.

It is self-evident that the features mentioned above and the features yet to be discussed below may be used not only in the respectively specified combination but also in other combinations or individually without departing from the scope of the invention.

Preferred exemplary embodiments of the invention are illustrated in the drawings and will be discussed in more detail in the following description, wherein identical or similar or functionally identical components are denoted by the same reference signs.

BRIEF DESCRIPTION OF THE DRAWING FIGURES

Figure 2:
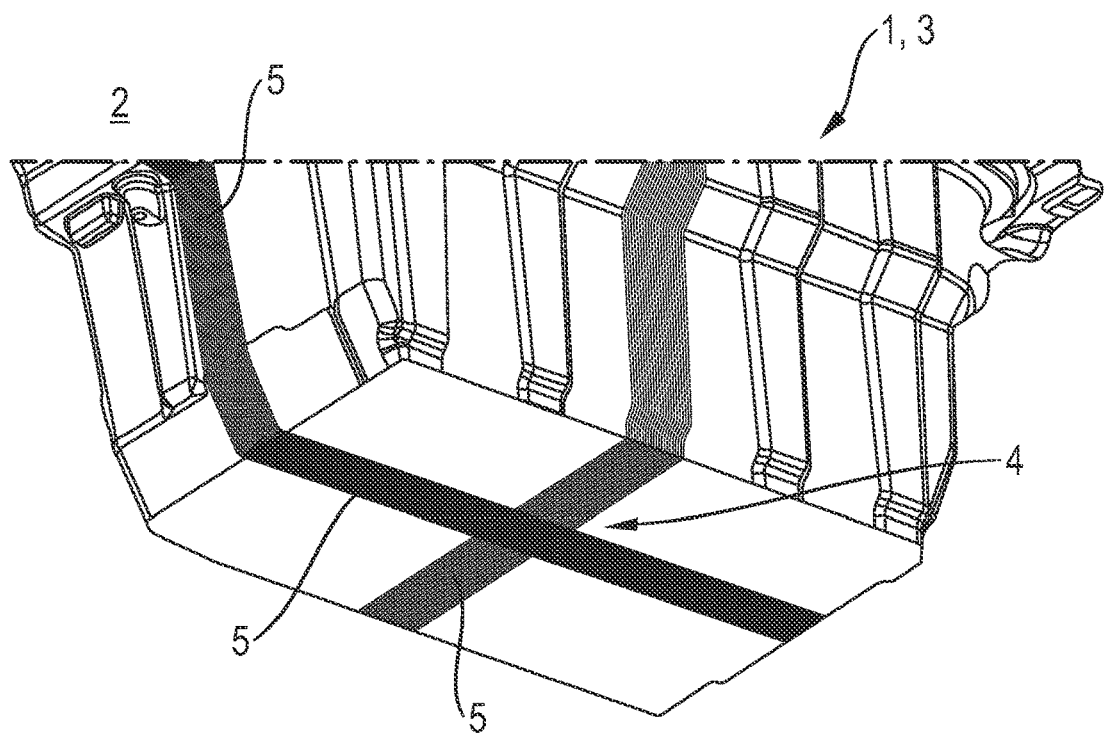
Figure 3:
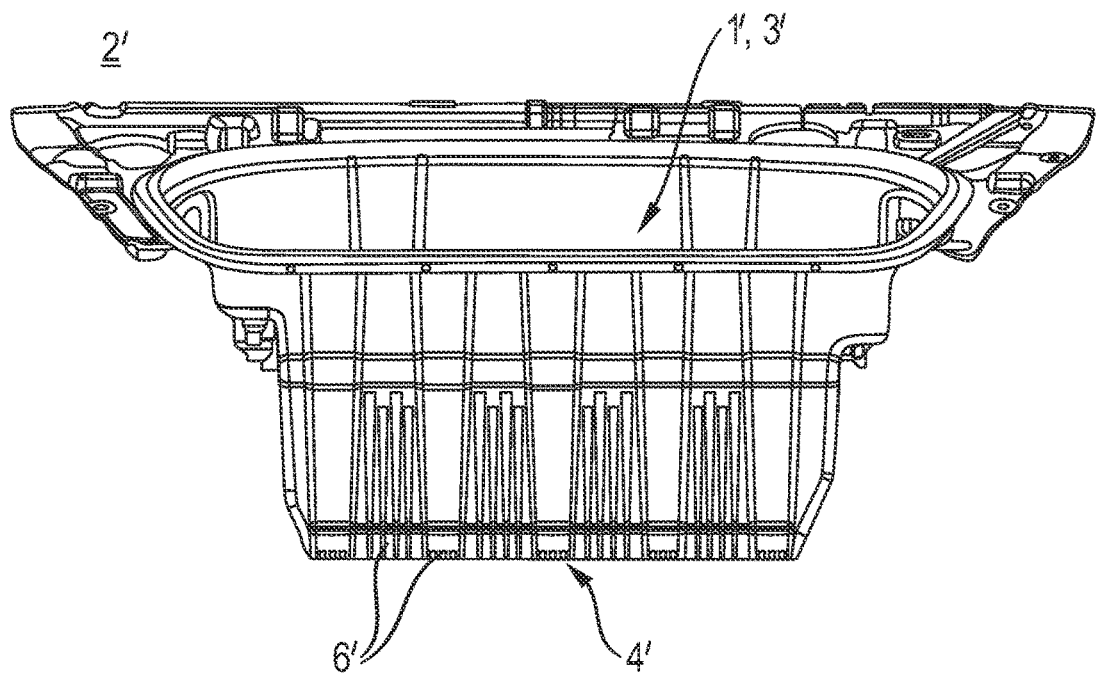
Figure 4:
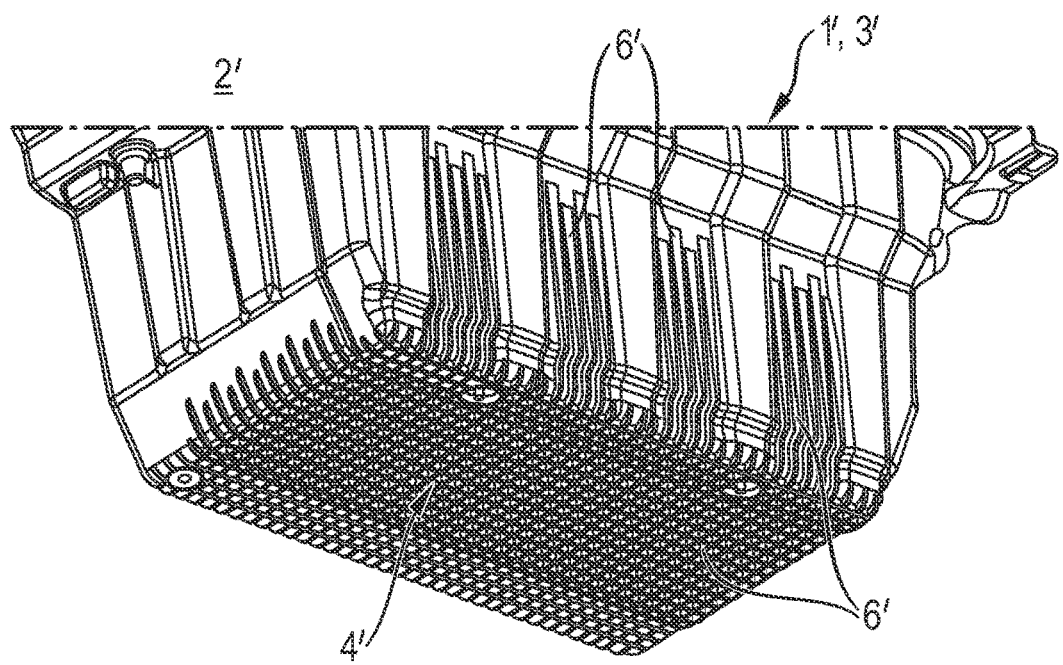

In the drawings, in each case schematically,

FIG. 1 shows a component according to aspects of the invention of a motor vehicle, having a stiffening tape according to aspects of the invention, FIG. 2 shows an illustration as in FIG. 1 but in an oblique view from below, FIG. 3 shows an illustration as in FIG. 1 but for a known component, FIG. 4 shows an illustration as in FIG. 2 but for a known component.

DETAILED DESCRIPTION OF THE INVENTION

Corresponding to FIGS. 1 and 2, a component 1 according to aspects of the invention of a motor vehicle 2, which component is for example in the form of a luggage tub 3, in at least one region 4 subject to tensile loading comprises at least one stiffening tape 5 having fibers embedded in plastic. The stiffening tapes 5 (cf. also FIG. 2) in this case serve as tensioning tapes and in the present case delimit a deflection of the luggage tub 3. This makes it possible for the rest of the region apart for the stiffening tape(s) 5 to have a thinner and thus more resource-conserving or more lightweight form.

According to FIGS. 3 and 4, what is illustrated in this case, analogously to FIGS. 1 and 2, is a known component 1', in which the stiffening tapes 5 according to aspects of the invention are not provided in the regions 4 subject to tensile loading. According to FIGS. 3 and 4, in this case the same components have the same reference signs, but with an apostrophe. In order to obtain the same stiffness for the components 1' according to FIGS. 3 and 4 as for the components 1 according to FIGS. 1 and 2, the components 1' according to FIGS. 3 and 4 have additional stiffening contours 6', which are in the form of ribs, for example. Stiffening contours 6' of this kind are no longer provided in the components 1 according to aspects of the invention corresponding to FIGS. 1 and 2, since in those figures the tensile loading occurring there can be intercepted by means of the stiffening tapes 5. As an alternative, a greater wall thickness is also conceivable, as a result of which the components 1' are however significantly heavier in order to achieve the same strength and stiffness.

The stiffening tape 5 may be in the form for example of UD (unidirectional) tape having unidirectional fibers, it being possible to use glass fibers, carbon fibers or natural fibers, for example. Especially the use of natural fibers allows an ecological manner of production. Aramid fibers are also conceivable, in particular carbon fibers and glass fibers allowing a considerable increase in the stiffness and strength along with comparatively low weight and thin design.

The stiffening tape 5 itself has a plastic matrix of a preferably thermoplastic material, in which the fibers are embedded. This makes it possible to cover the fibers in plastic and thus arrange them in a protected manner, this in particular being advantageous also for carbon fibers in terms of optionally required electrical insulation. The component 1 itself may be formed from metal, for example a light metal, in particular aluminum, or alternatively from a plastic, in particular a thermoplastic material. Of course, composite constructions with metal parts and plastics parts are also conceivable.

The stiffening tape 5 or the stiffening tapes 5 are connected to the component 1, for example the luggage tub 3, by a material bond, for example via a welded connection or an adhesive bond, so as to act in a force-transmitting manner. Purely theoretically, it is even conceivable that the at least one stiffening tape 5 is embedded in the plastic of the component 1, with the result that in this case the at least one stiffening tape 5 is placed into a plastics injection molding tool and then has the plastic of the component 1 injection molded around it. As a result, an especially protected arrangement of the fibers in the stiffening tape 5 or of the stiffening tape 5 in the plastic of the component 1 is possible.

A thickness of the stiffening tape 5 may in this case be between 0.1 mm and 1 mm, depending on the desired tensile strength and depending on the previously calculated tensile forces to be expected. A materially bonded connection between the stiffening tape 5 and the component 1, for example, can allow a two-dimensional introduction of force.

The at least one stiffening tape 5 according to aspects of the invention furthermore makes it possible to dispense with the stiffening contours 6' used up to now in corresponding components 1', as a result of which not only do plastics injection molding tools have a simpler configuration, but also it is possible to conserve resources and reduce weight. The components 1, for example luggage tubs 3 (which may also be referred to as trunk tubs or trunk liners), equipped with stiffening tapes 5 according to aspects of the invention that are used exclusively in the predefined region 4 subject to increased tensile loading make it possible to achieve a considerable saving in weight of up to 34% compared with luggage tubs 3', combined with an increase in volume. It should be understood that the luggage tub 3 is (or may be) an integral and non-removal component of the vehicle.

It is also the case that a motor vehicle 2 equipped with the luggage tub 3 according to aspects of the invention can consequently be constructed in a cost-effective, resource-conserving and at the same time more lightweight manner.

What is claimed:

1. A component of a motor vehicle, said component comprising:
    a load bearing structure including a hollow interior defined by at least five interconnected walls including four side walls and a bottom wall depending from each of the four side walls;
    stiffening tape having fibers embedded in plastic applied to the load bearing structure for reinforcing at least one region of the load bearing structure that is subject to tensile loading,
    said stiffening tape including (i) a first segment of said stiffening tape that is mounted to the bottom wall and a first set of opposing side walls of the four side walls, and (ii) a second segment of said stiffening tape that is mounted to the bottom wall and a second set of opposing side walls of the four side walls, wherein the first and second segments are arranged in a cross-wise manner for supporting the load bearing structure such that a portion of the first segment is positioned over top of a portion of the second segment,
    wherein at least one of the side walls of the first set of opposing side walls includes vertically extending ribs and a reduced thickness portion disposed between the vertically extending ribs, and the first segment of stiffening tape is positioned directly on and parallel to one of the vertically extending ribs,
    wherein each vertically extending rib extends from a flange disposed on a top surface of the load bearing structure to the bottom wall, and wherein the first segment of stiffening tape extends to the flange,
    wherein each vertically extending rib narrows in a direction from the flange to the bottom wall.

2. The component as claimed in claim 1, wherein the component is a luggage tub.

3. The component as claimed in claim 1, wherein the stiffening tape is unidirectional (UD) tape with unidirectional fibers.

4. The component as claimed in claim 1, wherein the stiffening tape comprises glass fibers, aramid fibers, natural fibers or carbon fibers.

5. The component as claimed in claim 1, wherein the stiffening tape has a plastic matrix of a thermoplastic material, in which the fibers are embedded.

6. The component as claimed in claim 1, wherein the component is formed from a thermoplastic material.

7. The component as claimed in claim 6, wherein the stiffening tape is embedded in the plastic of the component.

8. The component as claimed in claim 1, wherein the stiffening tape is adhesively bonded or welded, to the component.

9. The component as claimed in claim 1, wherein the component is formed from metal.

10. A motor vehicle having the component as claimed in claim 1, wherein the component is in the form of a luggage tub.

11. The component as claimed in claim 1, wherein the first segment of said stiffening tape is mounted to an exterior surface of the bottom wall and exterior surfaces of the first set of opposing side walls of the four side walls, and the second segment of said stiffening tape is mounted to the exterior surface of the bottom wall and exterior surfaces of the second set of opposing side walls of the four side walls, wherein each segment protrudes from the respective exterior surface to which the segment is mounted.

12. The component as claimed in claim 1, wherein each of the side walls include vertically extending ribs.

13. The component as claimed in claim 12, wherein the fibers of the stiffening tape also extend parallel to the vertically extending ribs.

14. The component as claimed in claim 1, wherein the first and second segments cross one another on the bottom wall.

15. The component as claimed in claim 1, wherein each segment of said stiffening tape has a thickness between 0.1 mm and 1.0 mm.

16. A component of a motor vehicle, said component comprising:
    a load bearing structure including a hollow interior defined by at least five interconnected walls including four side walls and a bottom wall depending from each of the four side walls;

stiffening tape having fibers embedded in plastic applied to the load bearing structure for reinforcing at least one region of the load bearing structure that is subject to tensile loading, said stiffening tape including (i) a first segment of said stiffening tape that is mounted to the bottom wall and a first set of opposing side walls of the four side walls, and (ii) a second segment of said stiffening tape that is mounted to the bottom wall and a second set of opposing side walls of the four side walls, wherein the first and second segments are arranged in a cross-wise manner for supporting the load bearing structure such that a portion of the first segment is positioned over top of a portion of the second segment, wherein at least one of the side walls of the first set of opposing side walls includes vertically extending ribs and a reduced thickness portion disposed between the vertically extending ribs, and the first segment of stiffening tape is positioned directly on and parallel to one of the vertically extending ribs, wherein an undercut is formed on said one of the vertically extending ribs at a location where said one of the vertically extending ribs meets the bottom wall, and wherein the first segment of stiffening tape extends over the undercut.

17. A luggage tub comprising:

a luggage tub body including a hollow interior defined by at least five interconnected walls including four side walls and a bottom wall depending from each of the four side walls;

stiffening tape having fibers embedded in plastic applied to the luggage tub body for reinforcing at least one region of the luggage tub body that is subject to tensile loading, said stiffening tape including (i) a first segment of said stiffening tape that is mounted to the bottom wall and a first set of opposing side walls of the four side walls, and (ii) a second segment of said stiffening tape that is mounted to the bottom wall and a second set of opposing side walls of the four side walls, wherein the first and second segments are arranged in a cross-wise manner for supporting the luggage tub body such that a portion of the first segment is positioned over top of a portion of the second segment, wherein at least one of the side walls of the first set of opposing side walls includes vertically extending ribs and a reduced thickness portion disposed between the vertically extending ribs, and the first segment of stiffening tape is positioned directly on and parallel to one of the vertically extending ribs, wherein each vertically extending rib extends from a flange disposed on a top surface of the load bearing structure to the bottom wall, and wherein the first segment of stiffening tape extends to the flange, wherein each vertically extending rib narrows in a direction from the flange to the bottom wall.

* * * * *